(12) United States Patent
Roberts et al.

(10) Patent No.: US 11,292,217 B2
(45) Date of Patent: Apr. 5, 2022

(54) COMPOSITE COMPONENT VOID REPAIR

(71) Applicant: General Electric Company, Schenectady, NY (US)

(72) Inventors: Herbert Chidsey Roberts, Middletown, OH (US); Timothy P. Coons, Cincinnati, OH (US); John Taylor Rockwell, Lake Bluff, OH (US)

(73) Assignee: General Electric Company, Schenectady, NY (US)

( * ) Notice: Subject to any disclaimer, the term of this patent is extended or adjusted under 35 U.S.C. 154(b) by 665 days.

(21) Appl. No.: 15/993,845

(22) Filed: May 31, 2018

(65) Prior Publication Data

US 2019/0366656 A1 Dec. 5, 2019

(51) Int. Cl.
| | | |
|---|---|---|
| *B29C 73/04* | (2006.01) | |
| *B29C 73/26* | (2006.01) | |
| *B32B 27/12* | (2006.01) | |
| *B32B 27/30* | (2006.01) | |
| *B32B 43/00* | (2006.01) | |
| *C04B 35/653* | (2006.01) | |
| *C04B 37/00* | (2006.01) | |
| *B23P 6/00* | (2006.01) | |

(52) U.S. Cl.
CPC ............. *B29C 73/26* (2013.01); *B23P 6/002* (2013.01); *B29C 73/04* (2013.01); *B32B 27/12* (2013.01); *B32B 27/30* (2013.01); *B32B 43/00* (2013.01); *C04B 35/653* (2013.01); *C04B 37/005* (2013.01); *B32B 2260/021* (2013.01); *C04B 2235/428* (2013.01); *C04B 2235/5244* (2013.01)

(58) Field of Classification Search
CPC ..... B32B 43/00; C04B 35/653; C04B 37/005; C04B 2235/5244; C04B 2235/428; B23P 6/002

See application file for complete search history.

(56) References Cited

U.S. PATENT DOCUMENTS

| | | | |
|---|---|---|---|
| 4,855,182 A | 8/1989 | Ondrejas et al. | |
| 6,149,749 A * | 11/2000 | McBroom | B29C 73/02 156/87 |
| 6,385,836 B1 * | 5/2002 | Coltrin | B29C 70/545 156/285 |
| 6,820,334 B2 | 11/2004 | Kebbede et al. | |
| 8,252,131 B2 | 8/2012 | Heng et al. | |
| 8,967,330 B2 | 3/2015 | Comon et al. | |

(Continued)

*Primary Examiner* — Jeffry H Aftergut
*Assistant Examiner* — Jaeyun Lee
(74) *Attorney, Agent, or Firm* — Dority & Manning, P.A.

(57) ABSTRACT

Methods for repairing composite component voids are provided. For example, one method comprises locating a void in a composite component and subjecting the composite component to a process for repair. The process for repair includes creating a flow path through the void, applying a filler material to the composite component at the flow path, and processing the composite component having the filler material. In some embodiments, the flow path has a first opening on a first side of the composite component and a second opening on a second, opposite side of the composite component. In other embodiments, at least one portion of the flow path extends at a first angle with respect to a lateral direction defined by the CMC component, and at least another portion extends at a second angle with respect to the lateral direction.

11 Claims, 8 Drawing Sheets

(56) References Cited

U.S. PATENT DOCUMENTS

| | | |
|---|---|---|
| 9,527,170 B2 | 12/2016 | Czerner |
| 9,545,774 B1 | 1/2017 | Heng et al. |
| 9,701,072 B2 | 7/2017 | Corman |
| 2013/0022471 A1* | 1/2013 | Roberts, III ............ C04B 41/52 |
| | | 416/229 R |
| 2014/0241900 A1 | 8/2014 | Roberts, III et al. |
| 2015/0360396 A1 | 12/2015 | Thomas et al. |
| 2016/0279744 A1 | 9/2016 | Harris |
| 2017/0050352 A1 | 2/2017 | Christensen et al. |
| 2017/0145560 A1 | 5/2017 | Weaver et al. |
| 2017/0284974 A1* | 10/2017 | Hershey ................ G01N 29/04 |

\* cited by examiner

COMPOSITE COMPONENT VOID REPAIR

FIELD

The present subject matter relates generally to composite components. More particularly, the present subject matter relates to repairing voids in composite components.

BACKGROUND

More commonly, composite components are being used in various applications, such as gas turbine engines. As one example, ceramic matrix composite (CMC) materials are more frequently being used for various high temperature applications. For example, because CMC materials can withstand relatively extreme temperatures, there is particular interest in replacing components within a combustion gas flow path of a gas turbine engine with components made from CMC materials. Typically, CMC materials comprise ceramic fibers embedded in a matrix material such as silicon carbide (SiC), silicon, silica, alumina, or combinations thereof. Plies of the CMC material may be laid up to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

One or more voids may form in the composite component, e.g., a void may develop during thermal and/or chemical processing or the component may be damaged during use such that a void or damaged area is left in the component. Repairing such voids has proven to be difficult. For instance, merely re-processing the composite component, e.g., performing a follow-up melt infiltration of a CMC component having a void therein, may fail to fill in or fully fill in the void. Further, machining out the void or damaged area, e.g., by grinding, and adding new material can unacceptable degrade the material properties of the composite component.

Accordingly, improved methods for repairing voids in composite components would be desirable. In particular, methods for repairing composite components that include creating a flow path for flowing a filler material to the void as part of re-processing the composite component would be beneficial. Further, creating the flow path such that the flow path extends completely through the composite component, i.e., from one side of the component to another side of the component, would be useful. Additionally, gas turbine engine composite components having repaired voids would be advantageous.

BRIEF DESCRIPTION

Aspects and advantages of the invention will be set forth in part in the following description, or may be obvious from the description, or may be learned through practice of the invention.

In one exemplary embodiment of the present subject matter, a method is provided. The method comprises locating a void in a composite component and subjecting the composite component to a process for repair. The process for repair includes creating a flow path through the void, applying a filler material to the composite component at the flow path, and processing the composite component having the filler material.

In another exemplary embodiment of the present subject matter, a method for repairing a void in a composite component is provided. The method comprises creating a flow path through the void, applying a filler material to the composite component at the flow path, and processing the composite component having the filler material. The flow path has a first opening on a first side of the composite component and a second opening on a second side of the composite component. The second side is opposite the first side.

In a further exemplary embodiment of the present subject matter, a method is provided. The method comprises locating a void in a ceramic matrix composite (CMC) component, creating a flow path through the void, inserting a filler material within the flow path, and subjecting the CMC component having the filler material within the flow path to a process that includes melt infiltration. The flow path has a first opening and a second opening. At least one portion of the flow path extends at a first angle with respect to a lateral direction defined by the CMC component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
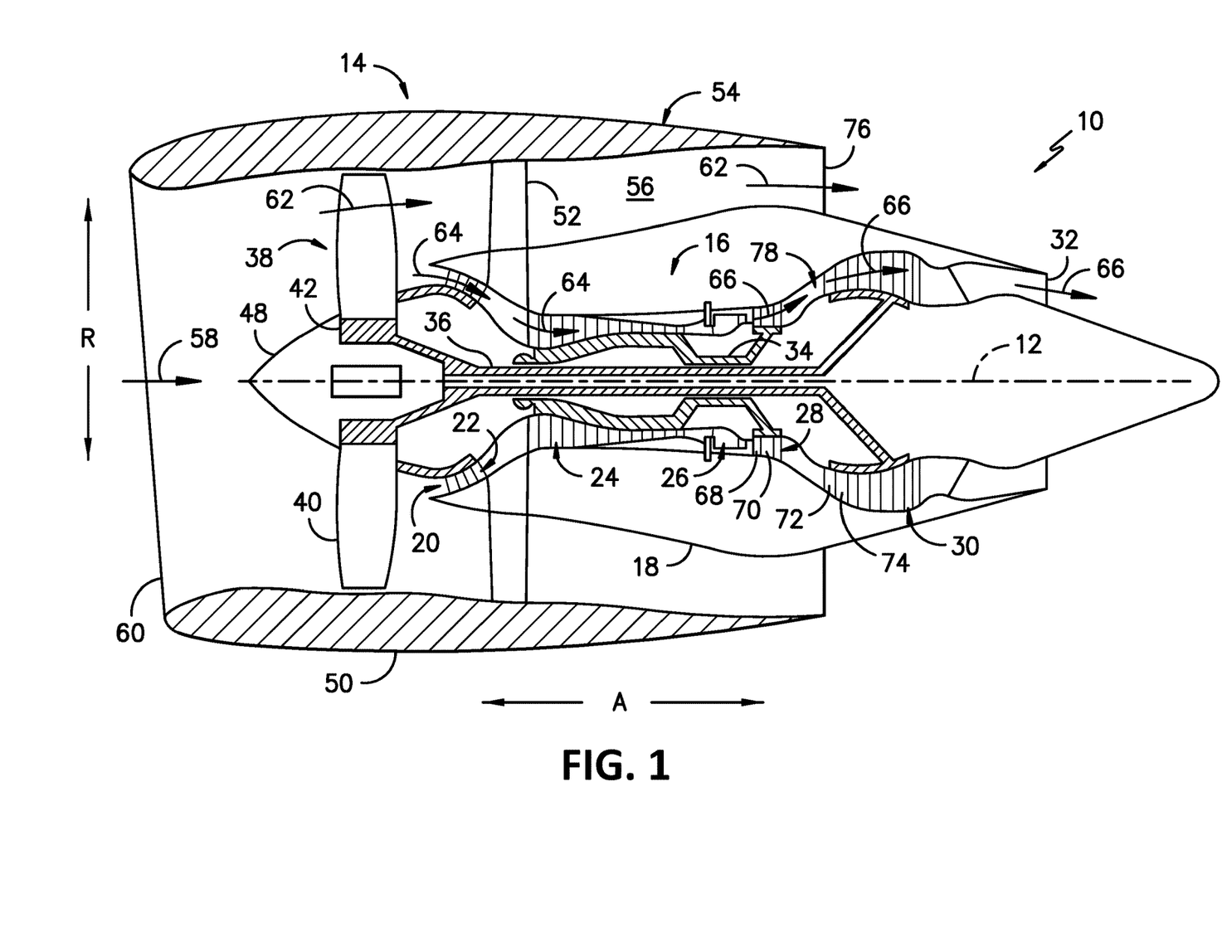
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within or defining the hot gas path 78, may comprise a composite material, such as a ceramic matrix composite (CMC) material having high temperature capability. In other embodiments, components in other portions of the engine 10, such as the fan section 14, may be made from a suitable composite material, e.g., a polymer matrix composite (PMC) material. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes.

Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

As stated, components comprising a composite material may be used within the hot gas path 78, such as within the combustion and/or turbine sections of engine 10. As an example, one or more stages of turbine rotor blades and/or turbine nozzles may be CMC components formed from CMC materials. However, composite components made from other composite materials, such as PMC components, may be used in other sections as well, e.g., the compressor and/or fan sections.

One or more composite components may experience localized damage during the life of the component or new composite material may need to be added to an existing composite component (i.e., after the composite component has been completely processed). For example, a CMC turbine blade may be damaged in service if a tip or cap of the blade comes into contact with a gas turbine shroud. The CMC component also could be damaged by foreign objects, e.g., a foreign object impinging one or more components of the hot gas path. Further, initial damage to a CMC component may lead to secondary damage if the CMC or ceramic fibers are exposed to moisture or other contaminates, e.g., in the combustion gases 66 within the hot gas path 78, which can cause recession of the CMC.

Figure 2:
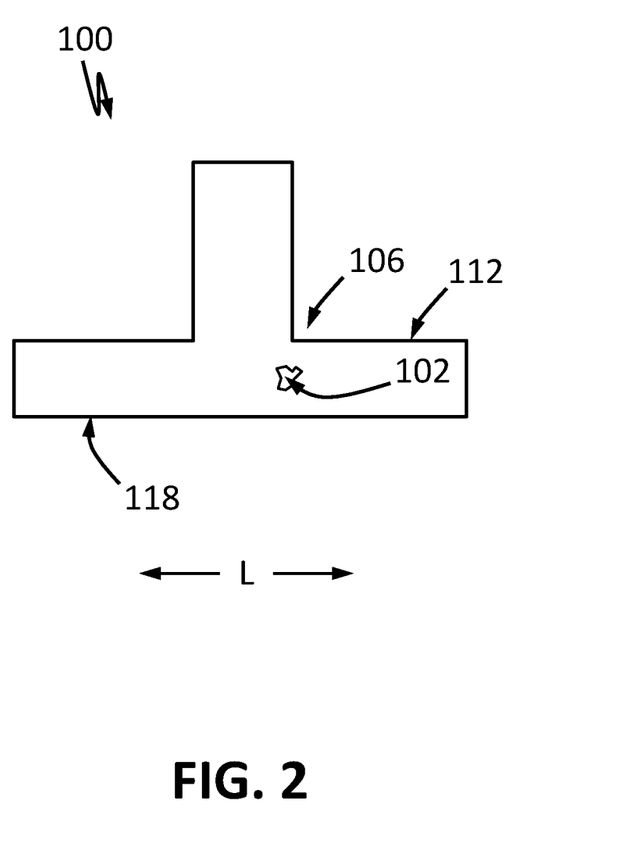
FIG. 2 provides a schematic cross-section view of a composite component having a void therein, according to an exemplary embodiment of the present subject matter.

Turning to FIG. 2, a schematic cross-section is provided of an existing composite component 100 having a void 102. The composite component 100 has been fully formed, i.e., thermally and chemically processed as described in greater detail herein. The void 102 may be repaired by filling the void 102 with a filler material 104 (FIG. 4) and processing the component 100 with the filler material 104 in the void 102 as described herein. The void 102 may be, e.g., a damaged area such as a cavity resulting from impingement by a foreign object during use of the component 100, inadvertent contact during use between the composite component 100 and an adjacent component, or any other source of damage to the component 100. In some embodiments, such a cavity or damaged area 102 can be formed on or in the composite component 100 through normal use and generally represents an area where fragments of the original composite material have been chipped off of the composite component 100. As used herein, the term "cavity" refers to any hollow space within the composite component 100, such as an opening, crack, gap, aperture, hole, etc. In other embodiments, the void 102 may form during the thermal and/or chemical processing used to fully form the composite component 100. For example, in the depicted embodiment, the void 102 is located within the component 100 near a corner 106 of the component 100. To form the corner 106 from plies of the composite material as previously described, the plies must bend in the area of the corner 106, e.g., the plies must bend approximately 90° to form the illustrated corner 106. During processing, one or more voids 102 may form in the vicinity of the bent plies, and voids 102 are more likely to form in the vicinity of the bent plies than in other areas of the component 100 due to, e.g., compression of the plies in the area of the bend, material movement (such as ply to ply sliding movement during processing due to process-based compressive forces or chemical off-gassing during processing), etc. Such voids, cavities, or damaged areas 102, which may be on an outer surface of or within the component 100, weaken the component 100.

To repair the void 102 as described herein, the void must first be located. Various methods or techniques may be used to locate any hidden or internal voids 102 in the composite component 100. For instance, non-destructive examination (NDE), such as ultrasound, X-ray, X-ray computed tomography (CT), micro CT inspection, and/or flash infrared thermography contrast analysis and imaging, may be used to detect and locate hidden or internal voids 102. Next, in embodiments in which the void 102 is a damaged area, the damaged area may need to be prepared prior to repairing the damaged area as described herein. For example, the damaged area 102 first may be scarfed, e.g., to clean matrix material and fibers from the damaged area and/or to otherwise prepare the area to receive repair or new material. In some embodiments, the damaged area 102 is scarfed by machining about the damaged area at a specific angle or to achieve a target aspect ratio, such as a width to depth ratio of 4:1, for the damaged area. In other embodiments, the damaged area 102 is scarfed by removing ceramic fibers protruding from or into the cavity and/or by removing loose matrix material from the cavity, but otherwise not enlarging the damaged area. In appropriate embodiments, the damaged area 102 may not require scarfing, such that scarfing is omitted or skipped. In other embodiments, the void 102 is not a damaged area but, e.g., porosity resulting from the formation of the composite component 100, and preparation of the void 102 for repair by scarfing or otherwise cleaning the void 102 is not required to repair the void 102.

Figure 3A:
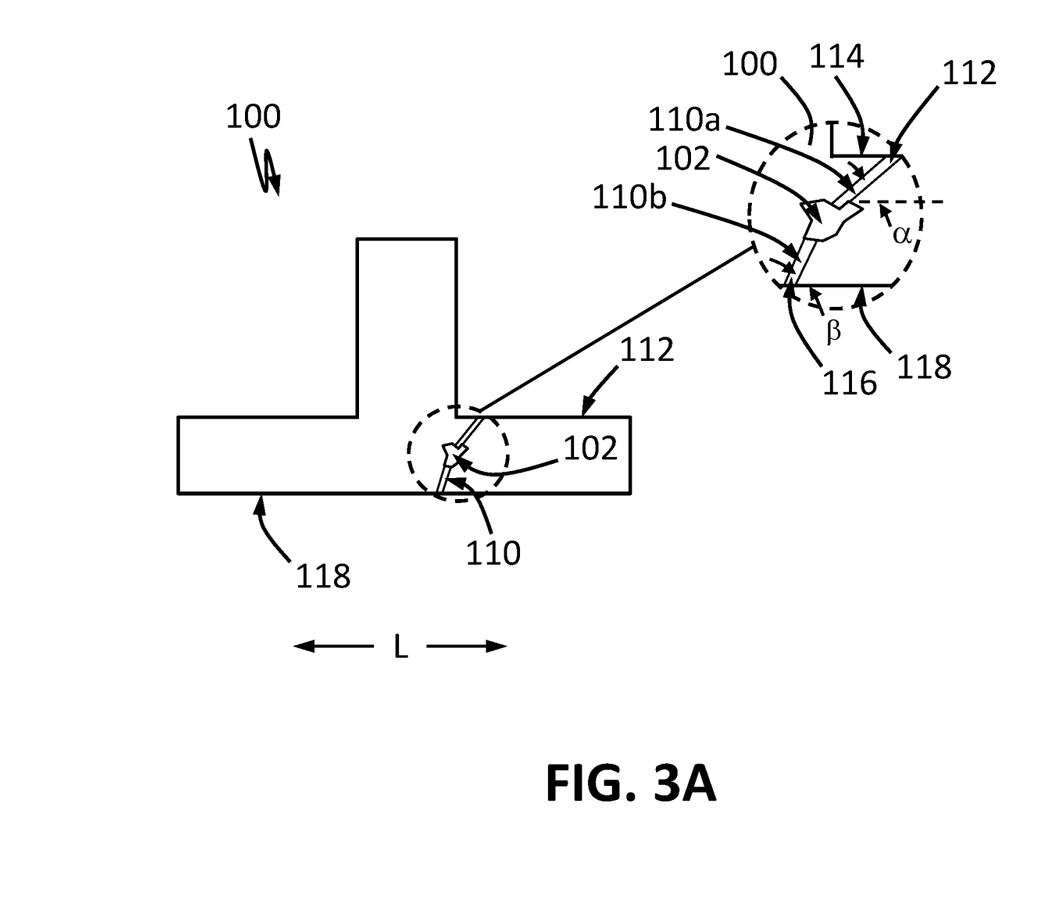
FIG. 3A provides a schematic cross-section view of the composite component of FIG. 2 with a flow path defined through the void, according to an exemplary embodiment of the present subject matter.
Figure 3B:
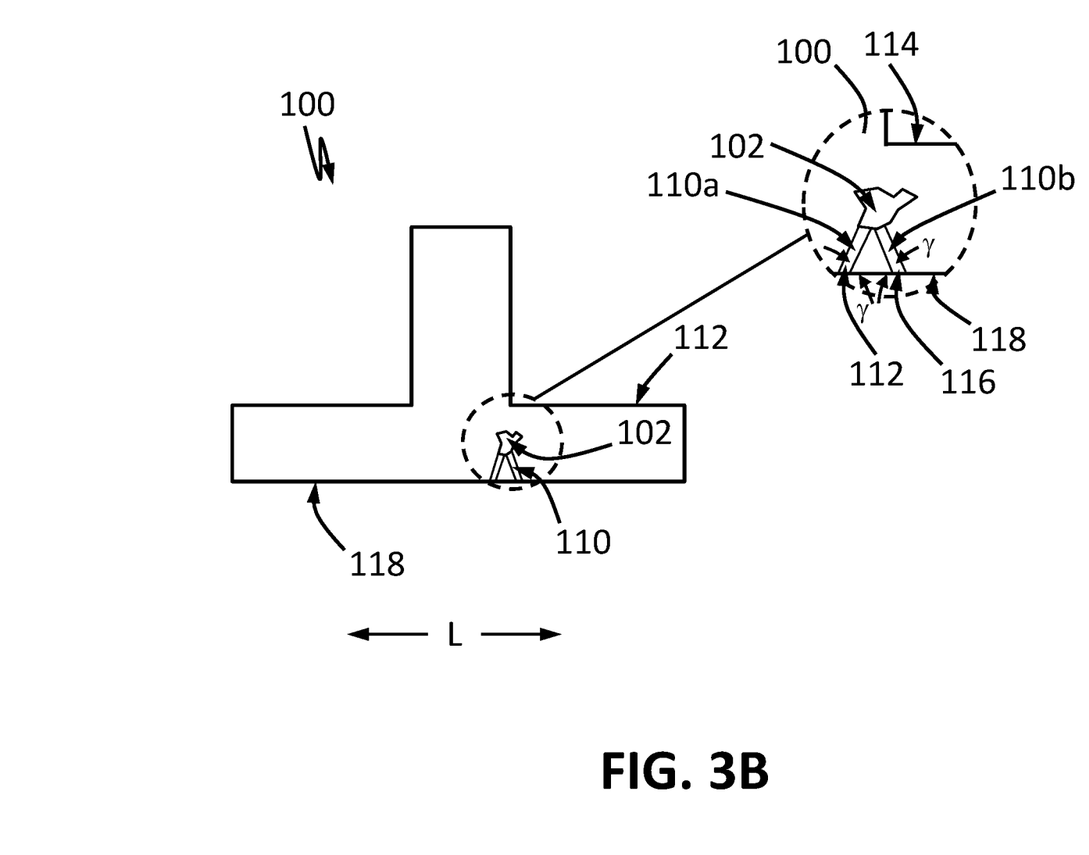
FIGS. 3B, 3C, and 3D provide schematic cross-section views of the composite component of FIG. 2, with a flow path defined through the void from different sides of the composite component, according to various exemplary embodiments of the present subject matter.
Figure 3C:
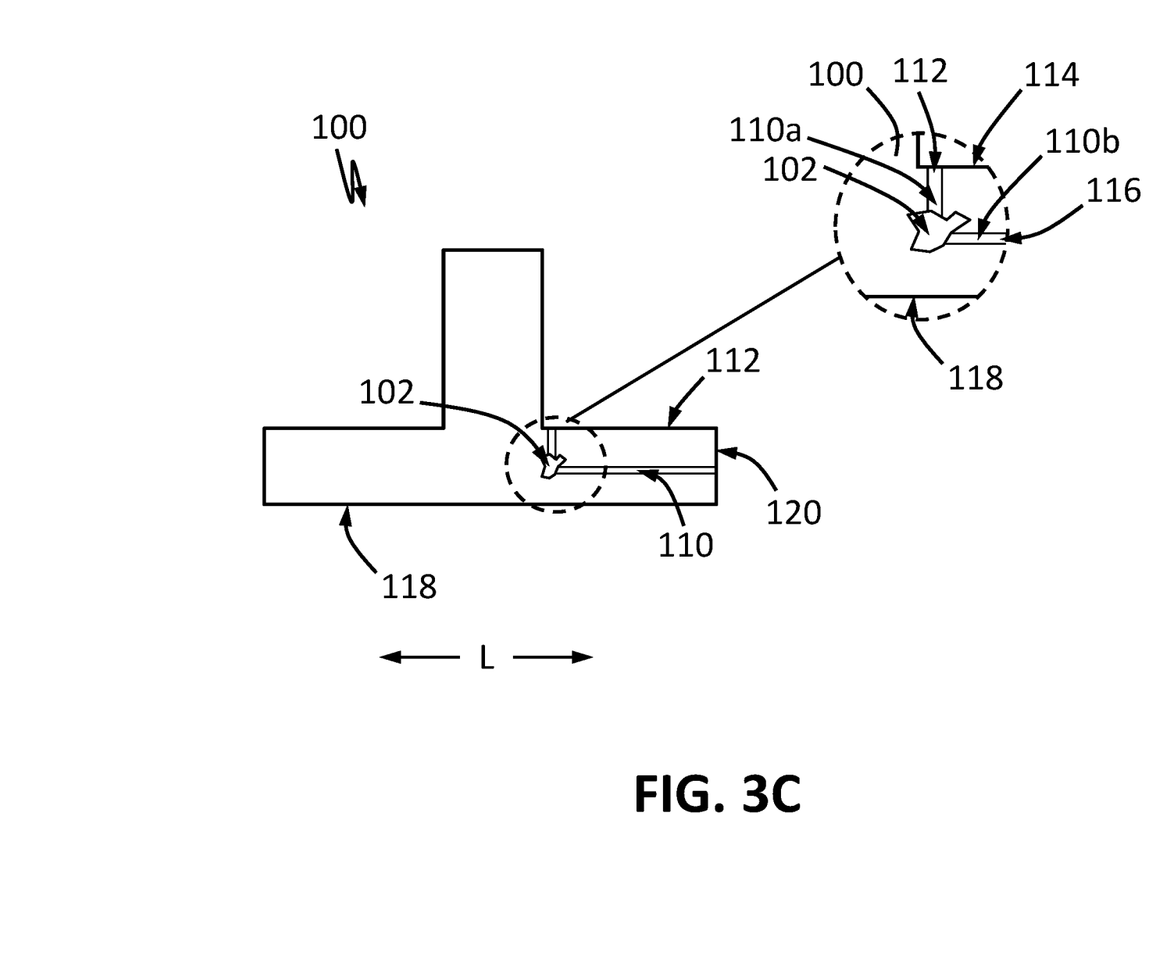
Figure 3D:
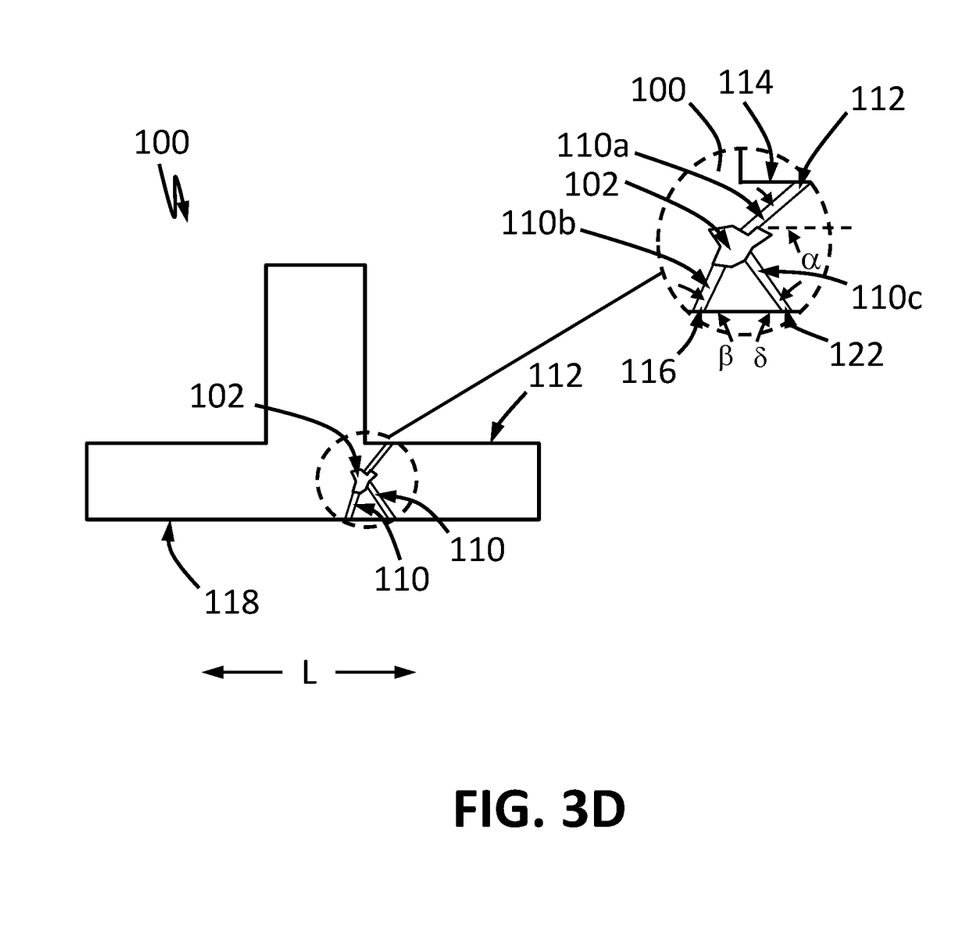

After the void 102 is located and prepared for repair, if needed, the composite component 100 having the void 102 is subjected to a process for repair. As shown in FIG. 3A, the process for repair includes creating a flow path 110 through the void 102. Referring to the enlarged view of a portion of FIG. 3A, in one exemplary embodiment, the flow path 110 has a first opening 112 on a first side 114 of the composite component and a second opening 116 on a second side 118 of the composite component 100. The second side 118 is opposite the first side 114 such that the flow path 110 extends completely through the component 100 and one of the first and second openings 112, 116 may be considered an inlet and the other of the openings 112, 116 may be considered an outlet. Turning to FIG. 3B, in another exemplary embodiment, each of the first opening 112 and second opening 116 may be defined on the same side of the composite component 100. In the depicted embodiment, the first and second openings 112, 116 are defined on the second side 118 of the component 100, and the flow path 110 extends completely through the void 102, with a first portion 110a and a second portion 110b of the flow path 110 forming a "V" shape through the void 102. Referring now to FIG. 3C, in yet another exemplary embodiment, the first opening 112 is defined on the first side of the composite component 100, and the second opening 116 is defined on a third side 120 of the component 100; the third side 120 is adjacent the first side 114. As such, the flow path 110 extends completely through the void 102, and the first portion 110a and the second portion 110b form an "L" shape through the void 102. It will be appreciated that the first and second openings 112, 116 may be defined on any appropriate side of the composite component 100, e.g., the flow path 110 may be defined through the void 102 from whatever side or sides of the component 100 are best suited for accessing the void 102. Further, in some embodiments, more than one flow path 110 may be defined through the void 102. For instance, as illustrated in FIG. 3D, a first portion 110a of a flow path 110 may be defined from the first side 114, a second portion 110b may be defined from the second side 118, and a third portion 110c may be defined from the second side 118. The first portion 110a of the flow path includes first opening 112 in the first side 114, the second portion 110b includes second opening 116 in the second side 118, and the third portion 110c includes a third opening 122 in the second side 118. The first portion 110a, second portion 110b, and third portion 110c form multiple flow paths 110 that extend completely through the void 102.

In an exemplary embodiment, the flow path 110 is created by laser drilling a hole through the composite component 100, where the hole is the flow path 110. The flow path 110 may be created in other ways as well, such as by electrical discharge machining (EDM), i.e., EDM drilling, or other suitable precision machining, drilling, or cutting techniques or processes. Preferably, the flow path 110 is as small as possible to allow sufficient filler material 104 to infiltrate the void 102, as described in further detail herein, without further weakening the component 100. For example, the flow path 110 may have a diameter of about 0.005" (five thousandths of an inch). The means for creating the flow path 110 (e.g., laser drilling, EDM, or the like) should be selected to disturb the composite component 100 as little as possible, such that the impact to the material properties of the component 100 by creating the flow path 100 are minimized. Thus, while some material properties of the composite component 100 are sacrificed to some extent in the creation of the flow path 110, the voids 102 are substantially eliminated by filling the void 102 and the flow path 110 as further described herein, which eliminates weakness in the component 100 due to such porosity and/or damage.

As further shown in FIGS. 3A-3D, the flow path 110 may be defined at one or more angles with respect to the composite component 100. For example, in the embodiment depicted in FIG. 3A, a first portion 110a of the flow path 110 extends at a first angle α with respect to a lateral direction L defined by the composite component 100, and a second portion 110b of the flow path 110 extends at a second angle β with respect to the lateral direction L. Accordingly, the flow path 110 illustrated in FIG. 3A is defined at more than one angle with respect to the composite component 100. In some embodiments, the first portion 110a may be drilled or machined (e.g., by laser drilling, EDM, etc. as described) from the first side 114 of the component 100 and the second portion 110b may be drilled or machined (as previously described) from a different entry angle on the second side 118 of the component 100 such that the first and second portions of the flow path 110 are defined at different angles. In other embodiments, the flow path 110 may extend in a generally straight line, i.e., generally linearly, and be defined from only one side of the composite component 100, such that a single entry point for drilling or machining the flow path 110 is used to define the flow path 110, which passes through the void 102, through the component 100. As shown in FIG. 3B, the first and second portions 110a, 110b may be defined at generally the same angle γ with respect to the lateral direction L such that the V shape is generally symmetrical. Further, as shown in the embodiment of FIG. 3C, the first and second portions 110a, 110b may be defined generally perpendicular to the sides 114, 120 of the composite component 100 such that a right angle is defined between the first and second portions 110a, 110b of the flow path 110. Moreover, as illustrated in FIG. 3D, in some embodiments each flow path portion 110a, 110b, 110c may be defined at a different angle $\alpha$, $\beta$, $\delta$ with respect to the composite component 100.

Figure 4:
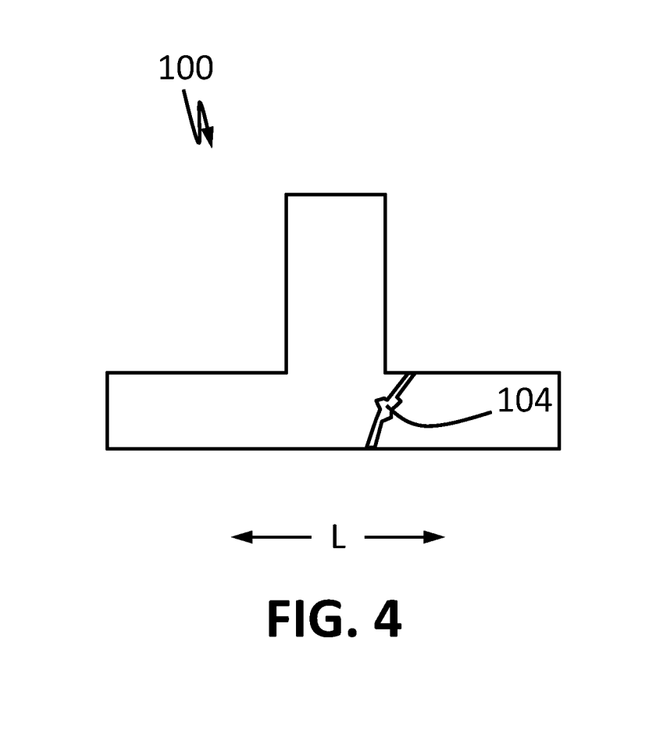
FIG. 4 provides a schematic cross-section view of the composite component of FIG. 3A, with the flow path and void filled with a filler material, according to an exemplary embodiment of the present subject matter.

Referring now to FIG. 4, a filler material 104 is applied to the composite component 100 at the flow path 110. More particularly, when the filler material 104 is applied to the component 100, the flow path 110 and the void(s) 102 are filled with the filler material 104. In some embodiments, the composite component 100 is a CMC component, and the filler material 104 is a Si-based chemical slurry. In an exemplary embodiment, the original composite component 100 is a CMC component, and the CMC of the component 100 may include silicon or a silicon alloy and also may contain silicon carbide. Examples of filler materials 104 that may be used for filling the flow path 110 and void(s) 102 in such a CMC include silicon, boron nitride, silicon carbide, silicon nitride, boron carbide, carbon, and combinations thereof. Various methods known to skilled artisans may be employed to apply the filler material 104 to the composite component 100, more particularly, to deposit the filler material 104 within the flow path 110 and void(s) 102. Any method suitable for applying a material with sufficient compatibility, in view of the composition of the CMC component 100, may be adopted for such use. The filler material 104 seals in silicon in the CMC during refurbishing, repair, restructuring, and the like, which may include subsequent melt infiltration (MI). When an MI step is performed to restructure, repair, rebuild, or otherwise refurbish a CMC component, such as a CMC component that was itself formed by an MI process, a temperature above the melting point of silicon may be applied. Conventionally, if residual silicon present in the CMC component has access to an ambient or furnace environment during such heating, it may evaporate and be lost from the CMC component, resulting in gaps, voids, pockets, fissures, or other porosity in the CMC component. Applying the filler material 104 to the CMC component 100, in accordance with the present invention, separates silicon within the component 100 from the ambient environment, such as during an MI process. Under such circumstances, although the CMC component 100 may be exposed to a temperature above, for example, a melting point of silicon, loss of silicon from the CMC component 100 and the failure to fill the void(s) 102, or the formation of additional porosity in the component 100, is reduced, minimized, or eliminated, because the filler material 104 prevents or impedes access of volatized silicon, and subsequent loss, to the ambient environment.

Conventional methods known to those skilled in the art may be used to apply or deposit the filler material 104 on the original composite component 100. Such conventional methods may generally include, but should not be limited to, plasma spraying; high velocity plasma spraying; low pressure plasma spraying; solution plasma spraying; suspension plasma spraying; high velocity oxygen flame (HVOF); electron beam physical vapor deposition (EBPVD); sol-gel; sputtering; slurry processes such as dipping, spraying, tape-casting, rolling, and painting; and combinations of these methods. In an exemplary embodiment, the filler material 104 may be deposited by a slurry process, e.g., dipping, spraying, tape-casting, rolling, or painting.

Once the filler material 104 fills the void(s) 102 and the flow path 110 of the composite component 100, the component 100 with the filler material 104 is processed to complete the repair. In some embodiments in which the component 100 is a CMC component, processing includes subjecting the component 100 having the filler material 104 to melt infiltration (MI) with a ceramic slurry. More specifically, a final densification step of the repair process may involve silicon melt infiltration (MI) into the CMC component 100 with the added filler material 104. That is, the CMC component 100 is heated while in contact with a source of silicon metal or alloy that produces a ceramic matrix when reacting with the matrix constituents. In some embodiments, a wick may be attached to the CMC component 100, and the external source of silicon for producing the ceramic matrix in the new filler material 104 is positioned in contact with the wick rather than in contact with the CMC component 100; the wick may allow better control of the infiltration compared to direct contact between the external silicon and the CMC component 100. The molten infiltrating silicon readily wets the matrix constituents (e.g., SiC and/or carbon matrix constituents) of the green filler material 104 and, therefore, is easily pulled into at least a portion of the porosity of the filler material 104 by capillary action. No external driving force is typically needed for the infiltration of silicon into the matrix constituents, and there is typically no dimensional change of the filler material 104 as the porosity thereof is filled with silicon. Current conventional processes for melt infiltration of fiber-reinforced CMCs using silicon (e.g., silicon metal or alloy) utilize batch processes where either silicon metal powder is applied onto the surface of the structure or silicon is transferred to the structure in the molten state using a porous carbon wick.

Figure 5:
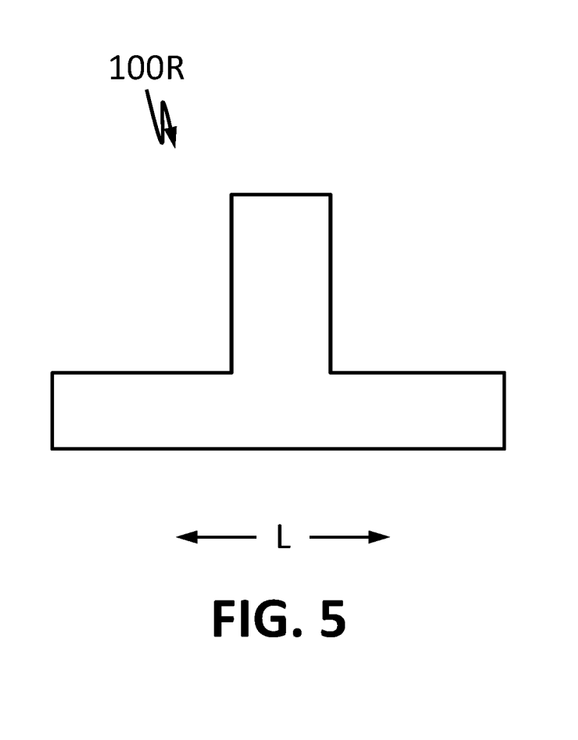
FIG. 5 provides a schematic cross-section view of the composite component of FIG. 4 after processing to form a repaired composite component, according to an exemplary embodiment of the present subject matter.

Upon infiltration of molten silicon, such as via capillary action during the silicon infiltration processes discussed above, the silicon is drawn into the matrix constituents of the CMC filler material 104 and may react with carbon thereof to form a SiC-based repaired CMC component 100R with a matrix portion including a substantially SiC crystalline structure about the fibers (e.g., SiC fibers). In addition to forming a ceramic SiC crystalline structure of a matrix portion, the silicon infiltration process fills at least some of the remaining porosity of the matrix portion with silicon metal or alloy that does not react with carbon of the constituents. In this way, interconnected pockets of "free" or un-reacted elemental silicon may be formed within the matrix portion. Accordingly, a matrix portion of an exemplary SiC-based CMC component 100R may be a substantially Si—SiC matrix portion.

Silicon may be disposed on the original CMC component 100 as described herein, then exposed to a temperature above the melting point of silicon, forming molten silicon. Molten silicon is then allowed to disperse into the CMC component 100 having the filler material 104. In another embodiment, silicon may be contacted to a wick then exposed to a temperature above the melting point of silicon to form molten silicon, which, by capillary action, may be drawn into the CMC component 100 and filler material 104. Molten silicon may be formed by exposing the external silicon on the CMC component 100 or wick contacting the external silicon to the component, to a temperature of between 1300° C. and 1600° C. For example, a temperature of between 1380° C. and 1500° C. may be attained. Temperatures outside these ranges may also be used. When it is no longer desirable or needed for silicon to remain in a molten form, the temperature may be lowered to a temperature below the melting point of silicon to permit it to solidify, such as distributed among and within matrix components of the newly repaired CMC component 100R.

In other embodiments, the composite component 100 is a PMC component and the filler material 104 is a resin that may be applied to the flow path 110 by syringe. That is, the filler material 104 may be injected into the flow path 110 to fill the flow path 110 and the void(s) 102. The resin may be, for example, polyetheretherketone (PEEK), polyetherketoneketone (PEKK), polyetherimide (PEI), polyphenylene sulfide (PPS), epoxy, bismaleimide (BMI), or a polyimide resins as previously described. In such embodiments in which the component 100 is a PMC component, after injecting the filler material 104 to fill the flow path and the void(s) 102, the component 100 is processed to complete the repair. For instance, processing includes subjecting the component 100 having the filler material 104 to autoclaving, which cures and solidifies the filler material 104 to form a repaired PMC component 100R.

It will be appreciated that, with respect to FIGS. 2-5, different portions or segments are shown for exemplary illustrative purposes and are not to scale. Any suitable composite component may be represented by the forms illustrated in FIGS. 2-5, including a gas turbine engine component such as a blade, a vane, a nozzle, a shroud, a combustor liner, or a center frame, or another component. For example, the gas turbine engine component may be a vane 68, a blade 70, a vane 72, or a blade 74, as described with respect to FIG. 1. Any of the foregoing components may be assembled into and rendered part of a gas turbine engine, such as turbofan engine 10 shown in FIG. 1, in accordance with the present subject matter. Further, it will be understood that the gas turbine engine component comprises an original composite component 100 with one or more repaired voids 102, which may be referred to as a repaired composite component 100R and has reduced porosity compared to the original composite component 100.

Figure 6:
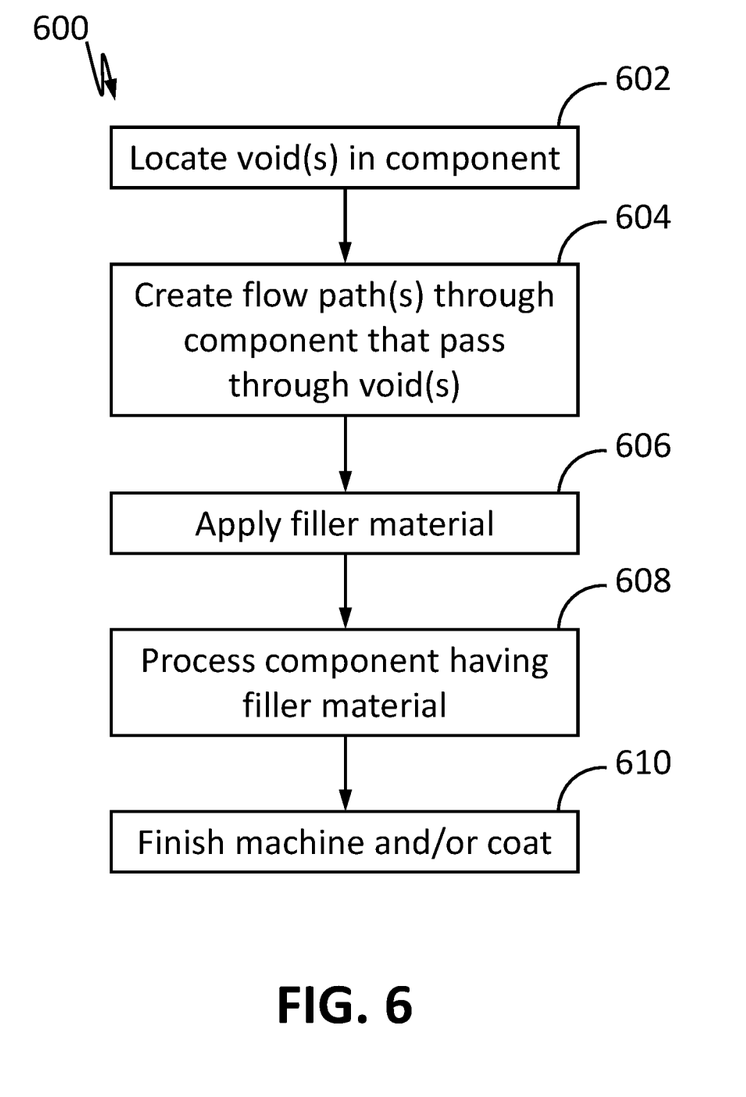
FIG. 6 provides a flow diagram of a method for repairing a void in a composite component, according to an exemplary embodiment of the present subject matter.

Turning now to FIG. 6, a flow diagram is provided that illustrates an exemplary method 600 for repairing a void in a composite component. As shown at 602 in FIG. 6, the method comprises locating one or more voids 102 in a composite component 100. As described herein, the composite component 100 is an existing, completely formed part that, e.g., may be a blade, vane, combustion liner, etc. of a gas turbine engine such as turbofan engine 10. For instance, the composite component 100 may be a stator vane 68 or rotor blade 70 of a HP turbine 28 of the engine 10, or a stator vane 72 or rotor blade 74 of a LP turbine 30 of the engine 10. Further, in various embodiments, the composite component 100 may be formed from a CMC or PMC material. In some embodiments in which the void 102 (or voids 102) is a damaged area as described herein, the method also comprises preparing the damaged area 102. In other embodiments, the damaged area 102 may not require preparation for repair, such that the method 600 does not include preparing a damaged area 102 prior to subjecting the composite component 100 to a process for repair. The process for repair need not be used to repair a damaged area 102; as described herein, the method 600 may be used to repair one or more voids 102 formed during the manufacture of the composite component 100. For example, the composite component 100 may be formed from a plurality of composite plies, and such voids 102 may form during densification of the component 100 in areas where the plies bend.

As shown at 604, the method 600 comprises creating a flow path 110 through the composite component 100, where the flow path 110 passes through the void 102. It will be appreciated that, in embodiments in which the method 600 is used to repair more than one void 102, a flow path 110 is created through each void 102, although a single flow path 110 may pass through more than one void 102. Each flow path 110 extends through the composite component 100. In some embodiments, each flow path 110 has a first opening 112 on a first side 114 of the composite component 100 and a second opening 116 on a second side 118 of the composite component 100. The second side 118 is opposite the first side 114 such that each flow path 110 extends from one side of the component 100 to another and passes through at least one void 102. Thus, each flow path 110 provides access to at least one void 102 from each of the first side 114 and second side 118 of the composite component 100, and although a single flow path 110 may pass through more than one void 102, each void 102 along the flow path 110 may be accessed from each of the first side 114 and the second side 118. In other embodiments, the flow paths 110 may be defined from the first side 114, the second side 118, and/or the third side 120 of the composite component 100, as shown in FIGS. 3B-3D. Of course, in some embodiments, a separate flow path 110 may be created for each void 102 of the composite component 100.

As previously described, each flow path 110 may extend substantially along a straight line or may be defined at more than one angle. More specifically, different portions of the flow path 110 may extend at different angles with respect to a reference point, line, or axis defined by the composite component 100, such as the lateral direction L defined by the component 100. In the embodiment depicted in FIG. 3A, a first portion 110a of the flow path 110 extends at a first angle α with respect to a lateral direction L, and a second portion 110b of the flow path 110 extends at a second angle β with respect to the lateral direction L. Accordingly, the flow path 110 illustrated in FIG. 3A is defined at more than one angle with respect to the composite component 100. As described, the first portion 110a may be drilled or machined (e.g., by laser drilling, EDM, etc. as described) from the first side 114 of the component 100 and the second portion 110b may be drilled or machined (as previously described) from a different entry angle on the second side 118 of the component 100 such that the first and second portions of the flow path 110 are defined at different angles. In other embodiments, the flow path 110 (or one or more flow paths 110 of a plurality of flow paths 110) may extend generally linearly, i.e., in a generally straight line, and be defined from only one side of the composite component 100, such that a single entry point for drilling or machining the flow path 110 is used to define the flow path 110, which passes through the void(s) 102, through the component 100. As illustrated in FIGS. 3B-3D, the portions 110a, 110b, 110c of each flow path 110 also may be defined at other angles γ, δ, ε, ζ with respect to the composite component 100. In some embodiments, a flow path 110 may form a V shape through a void 102, and in other embodiments, a flow path 110 may form an L shape through a void 102.

After the one or more flow paths 110 are created, as shown at 606 in FIG. 6, a filler material 104 is applied to the composite component 100 to fill the flow path(s) 110 and void(s) 102. In embodiments in which the composite component 100 is formed from a CMC material, the filler material 104 may comprise silicon, boron nitride, silicon carbide, silicon nitride, boron carbide, or another material, or combinations thereof, and the filler material 104 may be a slurry that is applied to the component 100. Wicking of silicon from the original CMC component 100 into the filler material 104 forms a structurally significant bond between the original CMC component 100 and the filler material 104. In embodiments in which the composite component 100 is formed from a PMC material, the filler material 104 may be a polymer resin that, e.g., is applied with a syringe to inject the filler material 104 into the flow path(s) 110 and void(s) 102.

After the filler material 104 is applied to the component 100, the component 100 is processed to form the repaired composite component 100R, as depicted at 608 in FIG. 6. Processing the component 100 may include heating (or firing) the component 100 having filler material 104 in a vacuum or inert atmosphere and densifying the component 100 having filler material 104. In an exemplary embodiment, the composite material is a CMC, and processing the CMC component 100 having filler material 104 includes heating the CMC component 100 to decompose the binders, remove the solvents, and convert the precursor to the desired ceramic matrix material. Due to decomposition of the binders, after heating the component 100 is a porous CMC fired body that undergoes densification, e.g., melt infiltration (MI), to fill the porosity and yield the repaired CMC component 100. In another embodiment, the composite material is a PMC, and processing the PMC component 100 having filler material 104 includes heating the PMC component 100 in an autoclave to cure the filler material 104.

Specific processing techniques and parameters will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane, and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by a tool during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Referring to 610 in FIG. 6, the method 600 optionally includes finish machining the repaired composite component 100R, if and as needed, and/or coating the repaired component 100R with one or more protective coatings, such as an environmental barrier coating (EBC). Moreover, the method 600 described above is provided by way of example only. As an example, other known methods or techniques for densifying a composite component may be utilized. Alternatively, any combinations of these or other known processes may be used. Further, although in the exemplary embodiments described herein the composite material is a CMC or a PMC, the composite material may be any composite material suitable for repair as described herein. Additionally, as described herein, the composite component 100 may be a gas turbine engine component, such as but not limited to a blade, a vane, a nozzle, a shroud, a combustor liner, or a center frame. In accordance with the present subject matter, a gas turbine engine, such as engine 10, may include such a gas turbine engine component.

Accordingly, as described herein, methods for repairing or filling voids in composite components include creating a flow path through the one or more voids, filling the flow path(s) and void(s) with a filler material, and processing the composite component having the filler material to densify the filler material with the component. Thus, one or more void(s) that, e.g., may form during melt infiltration of the original component or may be damaged areas formed during use of the original component, may be filled with an appropriate material to fill the void(s) and create a structurally sound part during follow-up densification. The flow path through the void(s) and the composite component helps ensure the void(s) are filled with the filler material and that the filler material is retained in the void during densification of the filler material and composite component. That is, the flow path creates access to the void(s) for the flow of repair material, i.e., the filler material, and the void(s) are filled with the composite material, e.g., the ceramic or polymer matrix material, during densification to repair the void(s). For instance, where the composite component is a CMC component, the flow path creates access to the void(s) for a flow of a chemical repair material, and when the flow path is melt infiltrated to densify the component, a ceramic slurry fills the void(s) and flow path to form a structurally sound, repaired CMC component. Extending the flow path completely through the component helps the filler material be retained within the flow path; if the flow path extended only to the void(s) and not all the way through the component, the filler material could percolate out of the flow path during subsequent heat processing, such that the void(s) and flow path are not properly filled in and the repair is not structurally sound. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:
1. A method, comprising:
   locating a void in a ceramic matrix composite (CMC) component; and
   subjecting the CMC component to a process for repair, the process for repair including creating a flow path through the void,
filling the void and the flow path with a filler material, and
processing the CMC component having the filler material,
wherein processing the CMC component includes subjecting the CMC component having the filler material to densification by melt infiltration through heating the CMC component having the filler material while in contact with a source of silicon, wherein a first portion of the flow path extends at a first angle with respect to a lateral direction defined by the CMC component, the first angle being non-zero and non-normal with respect to the lateral direction, and wherein a second portion of the flow path extends at a second angle with respect to the lateral direction such that the flow path is defined at more than one angle with respect to the CMC component, the second angle being non-zero and non-normal with respect to the lateral direction.

2. The method of claim 1, wherein the flow path has a first opening on a first side of the CMC component and a second opening on a second side of the CMC component, and wherein the second side is opposite the first side.

3. The method of claim 1, wherein the flow path has a first opening on a first side of the CMC component and a second opening on the first side of the CMC component.

4. The method of claim 1, wherein the flow path has a first opening on a first side of the CMC component and a second opening on a third side of the CMC component, and wherein the third side is adjacent the first side.

5. The method of claim 1, wherein creating the flow path comprises laser drilling a hole through the CMC component, the hole forming the flow path.

6. The method of claim 1, wherein the filler material comprises silicon.

7. A method for repairing a void in a composite component, comprising:
creating a flow path through the void, the flow path having a first opening on a first side of the composite component and a second opening on a second side of the composite component, the second side opposite the first side;
filling the void and the flow path with a filler material; and
processing the composite component having the filler material,
wherein a first portion of the flow path extends at a first angle with respect to a lateral direction defined by the composite component, the first angle being non-zero and non-normal with respect to the lateral direction, and
wherein a second portion of the flow path extends at a second angle with respect to the lateral direction such that the flow path is defined at more than one angle with respect to the composite component, the second angle being non-zero and non-normal with respect to the lateral direction.

8. The method of claim 7, wherein creating the flow path comprises laser drilling a hole through the composite component, the hole forming the flow path.

9. The method of claim 7, wherein the composite component is formed from a ceramic matrix composite material, and wherein processing the composite component includes subjecting the composite component having the filler material to melt infiltration by heating the component having the filler material while the composite component having the filler material is in contact with a source of silicon.

10. The method of claim 7, wherein the composite component is formed from a polymer matrix composite material, and wherein processing the composite component includes autoclaving the composite component having the filler material.

11. A method, comprising:
locating a void in a ceramic matrix composite (CMC) component;
creating a flow path through the void, the flow path having a first opening at an outer surface of the CMC component and a second opening at the outer surface of the CMC component, at least one portion of the flow path extending at a first angle with respect to a lateral direction defined by the CMC component;
filling the void and the flow path with a filler; and
subjecting the CMC component having the filler material within the flow path to a process that includes melt infiltration by heating the CMC component having the filler material while the CMC component having the filler material is in contact with a source of silicon, wherein a first portion of the flow path extends at a first angle with respect to a lateral direction, wherein a second portion of the flow path extends at a second angle with respect to the lateral direction such that the flow path is defined at more than one angle with respect to the composite component, wherein the first angle is a non-zero and non-normal angle with respect to the lateral direction, and wherein the second angle is a non-zero and non-normal angle with respect to the lateral direction.

* * * * *